United States Patent Office 3,522,193
Patented July 28, 1970

3,522,193
CATALYST AND METHOD OF PREPARING
UNSATURATED ALDEHYDES AND ACIDS
Jamal S. Eden, Akron, Ohio, assignor to The B. F. Goodrich Company, New York, N.Y., a corporation of New York
No Drawing. Original application Aug. 30, 1965, Ser. No. 483,802, which is a continuation-in-part of application Ser. No. 338,617, Jan. 20, 1964. Divided and this application Sept. 29, 1967, Ser. No. 679,951
The portion of the term of the patent subsequent to Jan. 11, 1983, has been disclaimed
Int. Cl. B01j 11/82
U.S. Cl. 252—435                                  3 Claims

ABSTRACT OF THE DISCLOSURE

Useful catalysts for vapor phase oxidation of propylene and isobutylene to acrolein and acrylic acid and methacrolein and methacrylic acid contain manganese molybdate, tellurium oxide and phosphorus oxide.

This is a division of application Ser. No. 483,802, filed Aug. 30, 1965, now abandoned, a continuation-in-part of application Ser. No. 338,617 filed Jan. 20, 1964, now U.S. Pat. 3,228,890.

This invention relates to new and useful catalysts and to a method of preparing unsaturated aldehydes and unsaturated carboxylic acids by oxidation of unsaturated hydrocarbons at an elevated temperature.

The invention relates more particularly to catalysts comprising manganese molybdate, tellurium oxide and phosphorous oxide in a molar ratio of 100 $MnMoO_4$, 10–100 $TeO_2$, and 50 $P_2O_5$ and to a method of preparing acrolein, methacrolein, acrylic acid or methacrylic acid by passing vapors of propylene or isobutylene and an oxygen containing gas over the catalyst at a temperature of from about 325° C. to about 550° C. The catalyst can also be designated as $Mn_{10}Mo_{10}Te_{1-10}P_{10}O_{67-85}$ with the P being in the form of an oxide.

Numerous attempts have been made in the past to prepare products of higher oxidation state from hydrocarbons, especially from the normally gaseous hydrocarbons. Prior catalysts and procedures for oxidizing monoolefinic gaseous hydrocarbons to monoolefinically unsaturated aldehydes or monoolefinically unsaturated carboxylic acids with the same number of carbon atoms as the hydrocarbon having serious shortcomings. The catalysts either have a very short active life, or they convert only a portion of the hydrocarbon to desired end groups per pass; they oxidize the hydrocarbon excessively to form high proportions of carbon monoxide or carbon dioxide or both; they are not sufficiently selective, so that the hydrocarbon molecule is attacked at both the olefinic unsaturation and at a methyl group; or the oxidation of the olefin does not proceed beyond the aldehyde stage.

In application Ser. No. 338,617, now U.S. Pat. 3,228,-890 there is disclosed a catalyst having unusually long life that will convert a substantial amount, more than 50% per pass, of a gaseous monolefin such as propylene or isobutylene to yield very high proportions of acrolein, methacrolein and acrylic acid or methacrylic acid. It is also unexpected to find a catalyst that produces a wide ratio of olefinic aldehyde to monoolefinically unsaturated carboxylic acid by controllable changes in reaction conditions or catalyst composition. This catalyst contained $MoO_3$, $TeO_2$ and $MnP_2O_7$. I have now found a different Mn containing catalyst which is equally efficient. Mol percent efficiencies of about 10 to about 35 for the aldehyde and about 45 to about 55 for the unsaturated carboxylic acid have been obtained with the catalyst and process of this invention wherein manganese is present as the molybdate and phosphorous as the oxide.

THE REACTANTS

The essential reactants are (1) propylene or isobutylene and (2) an oxygen containing gas, which can be pure oxygen, oxygen diluted with an inert gas, oxygen enriched air or air without additional oxygen. For reasons of economy, air is the preferred oxygen containing reactant.

For the purpose of this invention the hydrocarbons which are oxidized can be defined generically by the formula

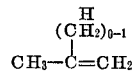

wherein it is also apparent that the end products formed result from the oxidation of only one methyl group on the hydrocarbon molecule while the terminal

remains intact.

Stoichiometric ratios of oxygen to olefin for the purpose of this invention are 1.5 to 1. Slightly lower amounts of oxygen can be used at a sacrifice of yield. It is preferred, however, to use 33 to 66% excess oxygen. A useful range is 1.5 to 4 mols of oxygen per mol of olefin. Larger excesses do not impair the yields of aldehydes and acids, but for practical considerations an excess much above 100% would require extremely large equipment for a given production capacity.

The addition of steam into the reactor along with the hydrocarbon and oxygen containing gas is desirable but not absolutely essential. The function of steam is not clear, but it seems to reduce the amount of carbon monoxide and dioxide in the effluent gases.

Other diluent gases can be used. Surprisingly, saturated hydrocarbons such as propane are rather inert under the reaction conditions. Nitrogen, argon, krypton or other known inert gases can be used as diluents if desired but are not preferred because of the added cost.

THE CATALYST AND ITS PREPARATION

There are several methods for the preparation of the catalyst, which can be supported or unsupported. Supported catalysts can be prepared by adding a dry support or an aqueous slurry thereof to an aqueous dispersion or solution of catalyst or the aqueous catalyst ingredients can be added to a slurry of the support.

Alternatively a slurry of the catalyst ingredients can be prepared in water, then dried and baked. For supported catalysts the aqueous slurry of the catalyst ingredients can be added to an aqueous suspension of the support or vice versa, and then dried and baked.

Another method is to blend the dry ingredients of the desired particle size and then mix them thoroughly. Thorough blending and uniform particle size is desired.

A specific example of the solution method is now set forth.

(a) Slurry one mol of $MnMoO_4$ in 100 ml. of water.

(b) Slurry 89.2 g. of ammonium tellurate in 100 ml. of water.

Add the tellurium slurry to the ganganese molybdate slurry.

(c) Add 115.3 g. of 85% $H_3PO_4$ to the mixture of slurries.

Dry the mixture on a steam bath and bake for 16 hours at 400° C. Thereafter, the catalyst is ground to the desired mesh size, as 10–18 mesh, and sieved. For supported catalysts an aqueous slurry of the support can be added to the catalyst ingredients, or vice versa, prior to drying and baking.

A supported catalyst may be prepared by adding to the slurry 240 grams of an aqueous colloidal dispersion of microspheroidal silica in a concentration of 30–35% $SiO_2$ (Ludox H.S.). The silica may also be added to one of the individual ingredients.

Among the suitable supports are silica, silica containing materials, such as diatomaceous earth, kieselguhr, silicon carbide, clay, aluminum oxides and even carbon, although the latter tends to be consumed during the reaction.

The exact chemical structure of the catalysts made by the above procedures is not known, but with molar ratios of about 100 Mn, 100 Mo, 10–100 Te and 100 P can be used for oxidizing the monoolefinic hydrocarbon to aldehyde and/or carboxylic acid. The catalyst contains chemically bound oxygen so that the generic formula can be written as $MnMoO_4$ 100 $TeO_2$ 10–100 $P_2O_5$ 50. The molar ratio of Mn to P is preferably about 1:1.

A preferred catalyst is one having a ratio of 100 $MnMoO_4$, 33 $TeO_2$ and 50 $P_2O_5$ because it gives high yields of desired products, and the preferred support is silica, because of its low cost and good fluidizing characteristics. Preferably, the catalysts containing a major proportion of $MnMoO_4$ with lesser proportions of $TeO_2$ and $P_2O_5$ and the molar ratio of Mn to P about 1:1.

REACTION CONDITIONS

The reaction can be carried out in either a fixed or fluidized catalyst bed.

The reaction temperature can range from about 300 to 450° C. for the oxidation of propylene but the preferred range is from about 350 to about 425° C. Below 350° C. the conversion per pass is lower than desirable and low temperature tends to produce more aldehyde than desired. Usually, a longer contact time is needed at lower temperatures to obtain the yields of desired products obtainable at higher temperatures. Above 425° C. in the propylene oxidation some of the desired end products appear to be oxidized to carbon oxides. This is much more apparent at 450° C. For isobutylene, oxidation temperatures of 375–550 are desirable with the preferred range being 300–450° C.

The molar ratio of oxygen to propylene or isobutylene should be at least 2 to 1 for good conversion and yields. Some excess oxygen, 33 to 66 mol percent is even more desirable and is preferred. There is no critical upper limit as to the amount of oxygen, but when air is used as the oxygen containing gas it becomes apparent that too great an excess will require large reactors, pumping, compressing and other auxiliary equipment for any given amount of desired end product. It is therefore best to limit the amount of air to provide a 33 to 66% excess of oxygen. This range provides the largest proportion of acid, under given reaction conditions. Also, since care is needed to avoid an explosive mixture, the limiting of air aids in that direction.

The molar ratio of steam to propylene or isobutylene can range from 0 to about 5 to 7, but best results are obtained with molar ratios of about 3 to 5 per mol of olefin and for this reason are preferred.

The contact time can vary considerably in the range of about 2 to 70 seconds. Best results are obtained in a range of about 8 to 54 seconds and this range is preferred. Longer contact times usually favor the production of acid at any given temperature.

The particle size of catalyst for fixed bed operations used is from 10–18 mesh. As is known, for fixed beds, the size may be of a wider range particle size.

For fluid bed systems the catalyst size should be from 80–325 mesh (U.S. Sieve).

The reaction can be run at atmospheric pressure, in a partial vacuum or under induced pressure up to 50–100 p.s.i. Atmospheric pressure is preferred for fixed bed systems and a pressure of 1 to 100 p.s.i. for fluid bed reactions. Operation at a pressure which is below the dew point of the unsaturated acid at the reaction temperature is advantageous.

The data in the example show that wide variations in percentages of unsaturated acids and aldehydes can be obtained with a single catalyst, using fixed ratio of reactants but changing the temperature and/or contact time. Further variation is obtainable by controlling the other variables in the reaction including the catalyst compositions within the limits set forth herein.

The examples are intended to illustrate the invention but not to limit it.

THE EXAMPLES

A series of runs was made in a fixed bed reactor of high silica (Vycor) glass tube 12 inches long and 30 mm. outer diameter. The reactor had three inlets, one for air, one for steam and one for propylene. Three external electrically operated heating coils were wound on the reactor. One of the coils extended along the entire length of the reactor and each of the remaining coils extended only about one half the length of the reactor.

Outlet vapors were passed through a short water cooled condenser. Uncondensed gases were passed through a gas chromatograph (Perkin-Elmer model 154D) and analyzed continuously. The liquid condensate was weighed and then analyzed for acrylic acid and acrolein in the gas chromatograph.

The reactor was filled to about 90% of its capacity with 170 ml. of a catalyst made by the solution method described above, having a ratio of 100 $MnMoO_4$, 33 $TeO_2$ and 50 $P_2O_5$. The catalyst was not supported and had a mesh size of 10–18 (U.S. Sieve).

Steam at a temperature of 200–250° C. was first passed into the reactor. Then propylene and air were separately fed into the stream of water vapor. This mixture then passed through a preheater and entered the reactor at about 200–250° C. The reactor was preheated to about 285° C. before the gas feed was begun.

The ratio of reactants per mol of propylene, oxygen, steam, cold contact time in seconds, and temperature are shown in the table below. The table summarizes the data obtained in these runs:

| | Oxygen, mols | Temp., °C. | Steam, mols | Contact time, seconds | Mol percent propylene converted | Mol percent yield on propylene converted | |
|---|---|---|---|---|---|---|---|
| | | | | | | Acr. | AA |
| Run No.: | | | | | | | |
| 1 | 3 | 370 | 4.06 | 46 | 96.1 | 29.24 | 47.23 |
| 2 | 3.04 | 365 | 4.2 | 60 | 100 | 19.52 | 45.72 |
| 3 | 3.04 | 380 | 4.2 | 60 | 100 | 11.88 | 55.25 |
| 4 | 4.02 | 368 | 4.2 | 48 | 96.6 | 35.98 | 47.64 |
| 5 | 4.02 | 380 | 4.2 | 48 | 99.5 | 32.70 | 48.79 |

I claim:
1. A catalyst composition consisting essentially of manganese molybdate, tellurium oxide and phosphorus oxide in molar ratio of 100 $MnMoO_4$, 10–100 $TeO_2$ and 50 $P_2O_5$.
2. A catalyst of claim 1 wherein the molar ratio is 100 $MnMoO_4$, 33 $TeO_2$ and 50 $P_2O_5$.
3. The composition of claim 1 on a silica support.

References Cited

UNITED STATES PATENTS

| | | | |
|---|---|---|---|
| 3,228,890 | 1/1966 | Eden | 252—437 |
| 3,254,110 | 5/1966 | Sennewald et al. | 252—437 XR |
| 3,342,849 | 9/1967 | Brill et al. | 252—437 XR |
| 3,392,188 | 7/1968 | Eden | 252—437 XR |

PATRICK P. GARVIN, Primary Examiner

U.S. Cl. X.R.

252—437; 260—533, 604